United States Patent
Beck et al.

(10) Patent No.: US 6,742,335 B2
(45) Date of Patent: Jun. 1, 2004

(54) EGR CONTROL SYSTEM AND METHOD FOR AN INTERNAL COMBUSTION ENGINE

(75) Inventors: N. John Beck, Bonita, CA (US); Hoi Ching Wong, San Diego, CA (US); Kresimir Gebert, Villa Park, IL (US)

(73) Assignee: Clean Air Power, Inc., San Diego, CA (US)

( * ) Notice: Subject to any disclaimer, the term of this patent is extended or adjusted under 35 U.S.C. 154(b) by 0 days.

(21) Appl. No.: 10/193,257

(22) Filed: Jul. 11, 2002

(65) Prior Publication Data

US 2004/0006978 A1 Jan. 15, 2004

(51) Int. Cl.[7] ............... F02B 33/44; F02M 25/06
(52) U.S. Cl. ............... 60/605.2; 123/568.17; 123/568.11; 239/265.11; 60/295; 60/278; 60/298; 60/291
(58) Field of Search ............... 60/605.2, 295, 60/278, 298, 291; 123/568.17, 568.11, 568.12; 239/8, 403, 463, 468, 433, 265.11

(56) References Cited

U.S. PATENT DOCUMENTS

| | | | |
|---|---|---|---|
| 3,680,534 A | * 8/1972 | Chavant | 123/568.17 |
| 4,426,848 A | 1/1984 | Stachowicz | 60/605.2 |
| 4,756,285 A | * 7/1988 | Pischinger | 123/568.17 |
| 5,273,019 A | 12/1993 | Matthews et al. | |
| 5,333,456 A | 8/1994 | Bollinger | |
| 5,426,936 A | 6/1995 | Levendis et al. | 60/278 |
| 5,440,880 A | 8/1995 | Ceynow et al. | 60/605.2 |
| 5,520,161 A | 5/1996 | Klopp | |
| 5,579,999 A | * 12/1996 | Seiner et al. | 239/265.11 |
| 5,601,068 A | 2/1997 | Nozaki | |
| 5,611,203 A | * 3/1997 | Henderson et al. | 60/605.2 |
| 5,611,204 A | 3/1997 | Radovanovic et al. | 60/605.2 |
| 5,617,726 A | 4/1997 | Sheridan et al. | 60/605.2 |
| 5,771,868 A | 6/1998 | Khair | 60/605.2 |
| 5,785,030 A | 7/1998 | Paas | 60/605.2 |
| 5,802,846 A | 9/1998 | Bailey | 60/605.2 |
| 5,806,308 A | 9/1998 | Khair et al. | 60/605.2 |
| 5,927,075 A | 7/1999 | Khair | 60/605.2 |
| 5,950,420 A | * 9/1999 | Geiger | 60/278 |
| 6,003,315 A | 12/1999 | Bailey | 60/605.2 |
| 6,003,316 A | * 12/1999 | Baert et al. | 60/605.2 |
| 6,009,704 A | 1/2000 | Feucht | |
| 6,009,709 A | * 1/2000 | Bailey | 60/605.2 |
| 6,035,639 A | 3/2000 | Kolmanovsky et al. | |
| 6,038,860 A | 3/2000 | Bailey | 60/605.2 |
| 6,062,026 A | 5/2000 | Woollenweber et al. | 60/605.2 |
| 6,116,026 A | 9/2000 | Freese, V | 60/605.2 |
| 6,128,902 A | 10/2000 | Komanovsky et al. | |
| 6,164,063 A | 12/2000 | Mendler | |
| 6,205,785 B1 | 3/2001 | Coleman | 60/605.2 |
| 6,209,530 B1 | 4/2001 | Faletti et al. | |
| 6,216,458 B1 | 4/2001 | Alger et al. | 60/605.2 |
| 6,237,335 B1 | 5/2001 | Lönnqvist | 60/605.2 |

(List continued on next page.)

*Primary Examiner*—Thomas Denion
*Assistant Examiner*—Thai-Ba Trieu
(74) *Attorney, Agent, or Firm*—Boyle Fredrickson Newholm Stein & Gratz S.C.

(57) ABSTRACT

EGR mass fraction or a value indicative thereof can be calculated based on temperature measurements rather than mass flow and/or pressure measurements, hence negating the need for expensive and relatively unreliable measurement devices in an active EGR system for an internal combustion engine. The EGR system may be a low pressure EGR system configured to direct cooled, filtered EGR to the engine's air intake system using an effective, simple venturi and/or a continuously regenerated catalytic particulate trap. The resultant system can reduce NOx emissions in a diesel engine on the order of 50% and approximately 90% for CO, HC, and PM. NOx and other emissions can be reduced still further when the EGR system is combined with other pretreatment and/or after treatment devices. Many components of the low pressure EGR system are also usable in a passive EGR system.

2 Claims, 4 Drawing Sheets

U.S. PATENT DOCUMENTS

| | | | |
|---|---|---|---|
| 6,237,336 B1 | 5/2001 | Feucht et al. | 60/605.2 |
| 6,244,256 B1 | 6/2001 | Wall et al. | 60/605.2 |
| 6,267,106 B1 | 7/2001 | Feucht | 123/568.17 |
| 6,286,489 B1 | 9/2001 | Bailey | 123/568.11 |
| 6,301,887 B1 | 10/2001 | Gorel et al. | 60/605.2 |
| 6,338,245 B1 * | 1/2002 | Shimoda et al. | 60/278 |
| 6,347,519 B1 * | 2/2002 | Kreso | 60/605.2 |
| 6,425,382 B1 * | 7/2002 | Marthaler et al. | 123/568.17 |
| 6,438,948 B2 * | 8/2002 | Ono et al. | 60/278 |
| 6,497,095 B2 * | 12/2002 | Carberry et al. | 60/295 |
| 6,526,753 B1 * | 3/2003 | Bailey | 60/605.2 |
| 2002/0073979 A1 * | 6/2002 | Lepp et al. | 123/568.18 |
| 2002/0078935 A1 * | 6/2002 | Opris | 60/605.2 |
| 2003/0015596 A1 * | 1/2003 | Evans | 60/605.2 |
| 2003/0070425 A1 * | 4/2003 | Kokusyo et al. | 60/295 |
| 2003/0101713 A1 * | 6/2003 | Dalla Betta et al. | 60/295 |

* cited by examiner

EGR CONTROL SYSTEM AND METHOD FOR AN INTERNAL COMBUSTION ENGINE

BACKGROUND OF THE INVENTION

1. Field of the Invention

The invention relates to internal combustion engines and, more particularly, relates to a system and method for the simplified control of an exhaust gas recirculation (EGR) system of such an engine.

2. Discussion of the Related Art

Countries worldwide are implementing ever-stricter emission(s) standards for diesel and other internal combustion engines. Past and some current standards for oxides of nitrogen (NOx), hydrocarbon (HC), and particulate emissions have been met through various improvements to engine design, advancements in fuel injection equipment, and controls, etc. However, many of these techniques are incapable of meeting stricter emission standards that are being implemented or will soon be implemented by the United States and many other countries. Exhaust gas recirculation (EGR) is therefore becoming an increasingly-important weapon in the war against emissions.

EGR systems have been used for decades to reduce NOx emissions and, as now developed, have been successfully applied to modern gasoline engines to meet past and current emission regulations. Because of the tightening NOx standards for compression ignition (diesel) engines, EGR systems are currently being investigated for application to diesel engine emission systems for reduction of NOx. However, application of EGR systems to diesel engines presents several distinct challenges. For instance, the direct recirculation of hot exhaust gases to the air intake system of a diesel engine increases air intake manifold temperature, increasing hydrocarbon emissions and particulate levels due to deterioration of the combustion process. In addition, soot and other particulates in the EGR system accumulate in the aftercooler and other components of the engine's intake and exhaust system, decreasing the effectiveness of those components and shortening their useful lives. Moreover, unlike in a throttled otto cycle engine, an unthrottled diesel engine often experiences an insufficient differential pressure across the EGR line to generate an EGR flow sufficient to obtain an optimal EGR mass fraction in the air/EGR mixture inducted into the engine.

Some of the problems associated with attempting to reduce emissions in a diesel engine through EGR, and proposed solutions to them, are discussed, e.g., in U.S. Pat. No. 5,440,880 to Ceynow, U.S. Pat. No. 5,806,308 to Khair, and U.S. Pat. No. 6,301,887 to Gorel. For instance, the Gorel patent discloses a so-called low pressure EGR system for a turbocharged diesel engine. The Gorel EGR system includes an exhaust particulate filter that is located downstream of and in fluid communication with the outlet of the turbocharger turbine for removing particulate matter from the exhaust gases. It also includes a low-pressure EGR line that extends from an inlet located within the main exhaust particulate filter to an outlet located upstream of the turbocharger compressor and downstream of the engine's air filter. An EGR valve, an EGR cooler, and an EGR return are located in series within the EGR line. In addition, an EGR pick-up unit is located at the inlet of the EGR line within the main particulate filter. It has an internal particulate filter to remove particulates from the EGR stream.

According to the text of the Gorel patent, positioning the EGR pick-up unit upstream of the main soot filter places the EGR inlet in the high exhaust pressure environment created by the main particulate filter. The high exhaust backpressure and vacuum in the air intake are said to create sufficient differential pressure across the EGR line to allow for substantial EGR rates.

Solutions proposed by the Gorel patent and others solve some of the problems discussed above to the extent that it is now possible to implement a practical EGR system in a diesel engine on either an OEM or an aftermarket basis. However, available EGR designs useable in diesel or other engines still exhibit drawbacks and disadvantages that limit their market acceptance.

For instance, many EGR systems are so-called "active" systems that employ an EGR valve that can be selectively controlled to vary EGR to optimize engine operation at existing load conditions. Depending on speed, load, and other parameters, the typical EGR valve is controlled to provide EGR on the range of 0 to 50% of total gas flow. Active control of the EGR valve requires knowledge or at least an indication of the percentage of the EGR in the mixture. This percentage is usually determined on a mass fraction basis, i.e., on the basis of the fraction of the mass of the EGR of the total mass of the EGR/air mixture. EGR mass fraction historically has been determined directly from direct mass flow measurements obtained both downstream and upstream of the venturi or other device used to draw EGR into the incoming air stream. This technique requires the incorporation of at least two mass flow sensors in the EGR system—one measuring EGR mass flow and one or two measuring the fresh air mass flow and/or the mixture mass flow. These mass flow sensors are relatively expensive and unreliable.

In addition, prior attempts to increase the back pressure in an EGR system sufficiently to obtain EGR percentages of levels desired at low load have proven only partially effective and/or have required the incorporation of rather complex, expensive back pressure generation devices into the EGR system. For example, the pick up unit proposed in the Gore patent is much more complex and expensive than a simple venturi. Finally, the particulate trap of these systems tends to become clogged with particulates at low operating temperatures.

Proposals have been made to eliminate the need to sense mass flows directly in an EGR system, hence addressing some of the problems discussed above. For instance, U.S. Pat. No. 6,035,639 to Kolmanovsky proposes the estimation of gas flow in a turbocharged diesel engine by estimating an EGR flow value as a function of a measured intake manifold pressure, a measured exhaust manifold pressure, a measured position of an EGR valve, and a measured EGR temperature. From this calculation, the system generates an intake air flow value (MAF). The MAF value then is used to control the position of the EGR valve. This system, while lacking the need for direct mass flow measurements, does not calculate EGR mass fraction or even a value indicative of it. It is also relatively complex, requiring the obtainment of at least the following items of information to control the EGR value:

Intake manifold pressure (MAP);
Exhaust manifold pressure (EXMP);
EGR valve setting;
EGR temperature; and
Intake air temperature.

Other systems relying in part on temperature based measurements rather than directly on mass flow measurements suffer similar deficiencies. Systems of this type are disclosed, e.g., in U.S. Pat. No. 5,273,019 to Matthews et al.; U.S. Pat. No. 5,520,161 to Klopp; and U.S. Pat. No. 5,601,068 to Nozaki. None of them calculate EGR mass fraction using only temperature measurements to obtain EGR related information.

Some of these problems, and particularly the mass flow sensor problem, extend beyond diesel engine EGR systems to the more traditional EGR systems for otto cycle engines as well. The need therefore has arisen to provide a simplified method and apparatus for determining a value indicative of the EGR mass fraction in an active EGR control system. The need additionally has arisen to provide a simple, reliable, effective structure and technique for directing EGR into an air induction system of an internal combustion engine. The need additionally has arisen to provide an EGR system with a reliable, low cost particulate trap whose effectiveness does not degrade at low temperatures.

SUMMARY OF THE INVENTION

In accordance with a preferred aspect of the invention, an improved method and system for controlling an EGR system includes measuring a temperature of the EGR exhaust gases, a temperature of the supply air, and a temperature of an EGR/mixture being directed toward the engine's air intake. The method additionally comprises calculating, based on the measuring step, a parameter indicative of a mass fraction of exhaust gases ($mf_{egr}$) in the mixture; and adjusting an engine operating parameter based on the calculating step. The calculating step preferably is performed solely on the basis of the measuring step. It may comprise calculating $mf_{egr}$, preferably by solving the equation:

$$mf_{egr} = \frac{T_{mix} - T_{air}}{T_{egr} - T_{air}}$$

The system preferably can be electronically controlled to selectively vary the EGR ratio as a function of engine operating conditions, and this control can be accomplished independently of the control the engine's fuel and air management systems. Automatic controls can be added to the system to adjust the EGR flow as a function of engine operating condition and to automatically regenerate the particulate trap. The preferred embodiment provides EGR in the range of 5 to 20% of total gas flow at full load and 0 to 50% at low load. The preferred embodiment utilizes an exhaust particulate filter for the EGR gas only, an EGR cooler after the filter, a second stage filter after the EGR cooler, and a fixed venturi in the intake air system. The preferred venturi, which is also usable in other systems, includes an air inlet, a mixed gas outlet, a throat located between the air inlet and the mixed gas outlet, and an exhaust gas inlet located in the vicinity of the throat. The venturi is configured to generate a suction pressure of between 0.04 and 0.08 atmospheres and has a throat Mach Number of between 0.1 and 0.5 at an air flow rate of between about 40 lb/min and 80 lb/min. More preferably, the venturi is configured to generate a suction pressure of about 0.06 atmospheres and having a throat Mach Number of about 0.3 at an airflow rate through the venturi of about 60 lb/min.

The particulate trap of the preferred embodiment, which is usable in other applications as well, may comprise an actively regenerated catalytic particulate trap that can be actively regenerated by injecting a fuel into the particulate trap. In this case, active regeneration is performed whenever a pressure differential thereacross exceeds a designated value. For maximum reduction of particulates, the size of the oxidizing particulate filter can be increased to accommodate the entire exhaust flow rather that only the part to be returned to the engine.

The end result is a variety of practical tools that can be applied individually or combined to control the exhaust emissions of internal combustion engines with particular emphasis on piston engines fuelled by diesel fuel, natural gas or a combination of both fuels.

Other aspects and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes.

BRIEF DESCRIPTION OF THE DRAWINGS

Preferred exemplary embodiment of the invention are illustrated in the accompanying drawings in which like reference numerals represent like parts throughout, and in which.

DETAILED DESCRIPTION OF THE PREFERRED EMBODIMENTS

1. Resume

Pursuant to the invention, a simple, reliable EGR system and method are provided that are usable with compression ignition and possibly other engines in either an OEM or a retrofit application. The system can be an active system that is electronically controlled to effectively vary the EGR ratio, preferably as a function of engine operating conditions independently of the engine fuel and air management systems. In this case, EGR mass fraction or a value indicative thereof preferably is calculated based on temperature measurements rather than mass flow and/or pressure measurements, hence negating the need for expensive and relatively unreliable sensors. The calculated value is then used as feedback in a closed loop EGR valve control process or as a control parameter for an open-loop process. The physical system preferably is a low pressure EGR system configured to be direct cooled, filtered EGR to the engine's air intake system using an effective, simple venturi and/or a continuously regenerated catalytic particulate trap. The resultant system can reduce NOx emissions in a diesel engine on the order of 50% and approximately 90% for CO, HC, and PM. NOx emissions can be reduced still further when the EGR system is combined with existing pretreatment and/or after treatment devices.

The temperature-based EGR mass fraction calculation described herein is usable with virtually any EGR system. Other aspects of the preferred embodiment of the EGR system, though applicable to a variety of EGR systems, are best suited for use with a compression ignition engine using either passive or active EGR control. Hence, the theory of a temperature-based EGR mass fraction calculation technique will first be described and validated, and a system employing that technique for active control of EGR will then be described.

2. Theory and Validation

EGR mass fraction ($mf_{egr}$) in a volume of a mixture of recirculated exhaust gases (EGR) is defined by the ratio of EGR mass to the total mass of the mixture as set forth in Equation 1:

$$mf_{egr} = \frac{m_{egr}}{m_{air} + m_{egr}} \quad (1)$$

where:

$m_{egr}$ is the mass of EGR, lb; and $m_{air}$ is the mass of air, lb.

Figure 1:
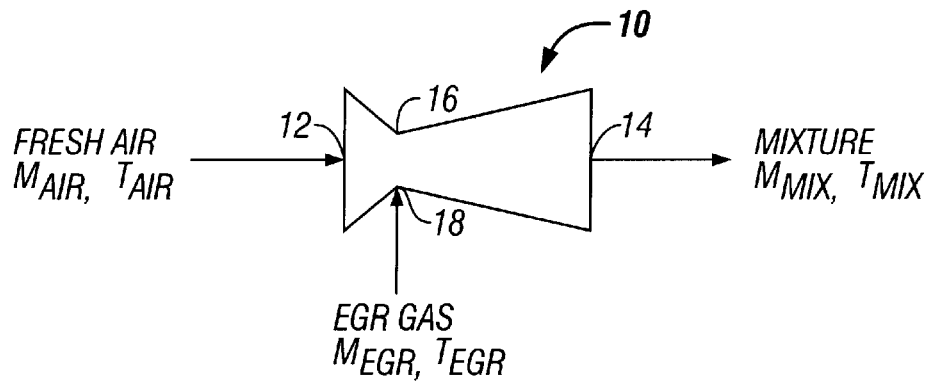
FIG. 1 schematically illustrates a venturi of an EGR system constructed in accordance with a preferred embodiment of the present invention.

In any practical system constructed in accordance with the invention, $m_{egr}$ is determined by directing air and EGR through a device in which the two streams intermingle and ultimately mix with one another. The presently preferred device is a venturi configured to cause air flowing therethrough to draw exhaust gases into the venturi, where the EGR is entrained and mixed with the flowing air. A venturi 10 configured in this manner is schematically illustrated in FIG. 1. The venturi 10 includes an air inlet 12, a mixed gas outlet 14, a throat or nozzle 16 located between the air inlet 12 and the mixed gas outlet 14, and an EGR 18 located in the vicinity of the throat 16. The air inlet 12 and mixed gas outlet 14 have maximum diameters $D_i$ and $D_o$, respectively, that are both considerably larger than the diameter $D_t$ at the throat 16. As a result, air flow through the venturi 10 draws EGR into the venturi through the EGR inlet 18. Depending on engine load and other conditions, the percentage of EGR will constitute from 0% to 50% of the total gases being inducted into the engine on a mass basis. Still referring to FIG. 1, the air temperature just upstream of the air inlet 12, the EGR just upstream of the EGR inlet 18, and the temperature just downstream of the mixture outlet 14 will be at respective temperatures $T_{air}$, $T_{egr}$, $T_{mix}$, respectively. At steady state, the quantities of air and EGR contained within a control volume do not vary. That is:

$$m_{mix} = m_{air} + m_{egr} \quad (2)$$

In the past, $m_{fegr}$ was determined by determining $m_{air}$ and $m_{mix}$ from the measured volumetric flow rates of the corresponding gases. However, it has been discovered that $m_{egr}$ can be measured indirectly from $T_{air}$, $T_{egr}$, and $T_{mix}$ if one makes the following assumptions about the engine:

1. The system operates at steady state;
2. No or at least negligible heat transfer occurs with the surroundings;
3. Kinetic and potential energy effects can be ignored, and no work done;
4. Air, EGR, and the mixture are regarded as ideal gases; and
5. EGR gas is treated as a pure component.

Using assumptions 1~3 together with Eq. (2), the energy rate balance of the gases reduces to $$m_{air} \cdot h_{air}(T_{air}) + m_{egr} \cdot h_{egr}(T_{egr}) - [m_{air} \cdot h_{air}(T_{mix}) + m_{egr} \cdot h_{egr}(T_{mix})] = 0 \quad (3)$$

where $h_{air}$ is the enthalpy of air, and $h_{egr}$ is the enthalpy of EGR.

Equation (3) can be rearranged as follows:

$$m_{air} \cdot [h_{air}(T_{air}) - h_{air}(T_{mix})] = -m_{egr} \cdot [h_{egr}(T_{egr}) - h_{egr}(T_{mix})] \quad (3a)$$

and ultimately $$m_{egr} = m_{air} \frac{h_{air}(T_{mix}) - h_{air}(T_{air})}{h_{egr}(T_{egr}) - h_{egr}(T_{mix})} \quad (4)$$

For a gas obeying the ideal gas model, the specific enthalpy depends only on temperature, so the specific heat $c_p$ is also a function of temperature alone. Hence, using assumption 4 above:

$$c_p(T) = \frac{dh}{dT} \quad \text{(ideal gas)} \quad (5)$$

The variables in Equation (5) can be restated as follows:

$$dh = c_p(T)dT \quad (5a)$$

and $$h(T_2) - h(T_1) = \int_{T_1}^{T_2} c_p(T) dT \quad \text{(ideal gas)} \quad (5b)$$

Eq. (4) then becomes $$m_{egr} = m_{air} \frac{T_{mix} \cdot c_{p_{air}}(T_{mix}) - T_{air} \cdot c_{p_{air}}(T_{air})}{T_{egr} \cdot c_{p_{egr}}(T_{egr}) - T_{mix} \cdot c_{p_{egr}}(T_{mix})} \quad (6)$$

Figure 2:
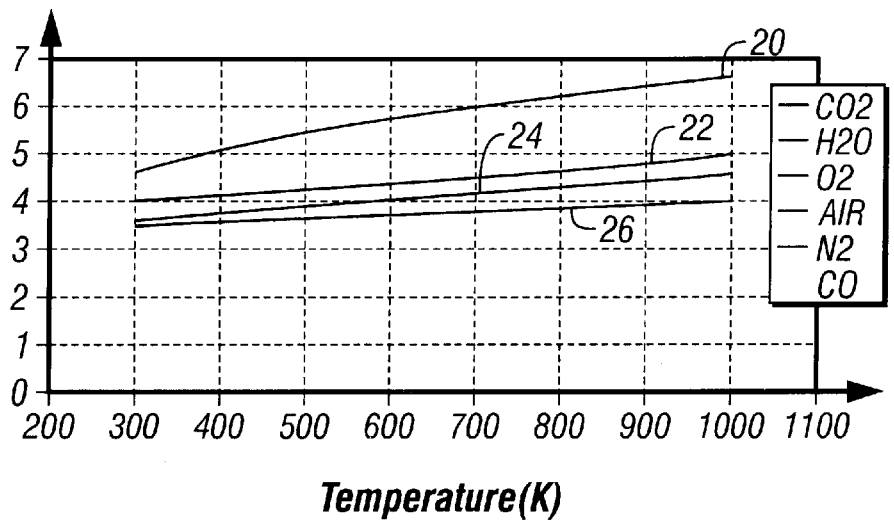
FIG. 2 is a graph illustrating variations of specific heat ($C_p$) versus temperature for various EGR gases.

Referring now to the curves 20–26 of FIG. 2, specific heat $c_p/R$ varies with temperature for a number of common gases. (Molar $c_p$ is in kJ/kmole-K, while R is the universal gas constant (8.314 kJ/kmole-K)). The $c_p$ increases with temperature for the selected gases in the range of temperatures shown. Since $T_{air}$, $T_{egr}$ and $T_{mix}$ will be below 350 K in all practical engines, known tabular specific heat data (taken on a mass basis) is known. The data is tabulated for selected gases in Table 1 for temperatures ranging from 250~350 K. Table 2 tabulates specific heat data on a molar basis, which can be used to analyze the specific heat of EGR gas.

TABLE 1

Specific heats $c_p$ of selected gases (kJ/kg-K)

| Temp. K | Air | $N_2$ | $O_2$ | $CO_2$ | CO | $H_2O$ |
|---|---|---|---|---|---|---|
| 250 | 1.003 | 1.039 | 0.913 | 0.791 | 1.039 | 1.848 |
| 300 | 1.005 | 1.039 | 0.918 | 0.846 | 1.040 | 1.862 |
| 350 | 1.008 | 1.041 | 0.928 | 0.895 | 1.043 | 1.881 |

Source: Adapted from K. Wark, Thermodynamics, 4th ed., McGraw-Hill, New York, 1983, as based on "Table of Thermal Properties of Gases", NBS Circular 564, 1955. $c_p$ for water vapor are derived from ideal gas properties of water vapor, as based on the JANAF Thermochemical Tables, NSRDS-NBS-37, 1971.

TABLE 2

Specific heats $c_p$ of selected gases (kJ/kmole-K)

| Temp. K | Air | $N_2$ | $O_2$ | $CO_2$ | CO | $H_2O$ |
|---|---|---|---|---|---|---|
| 250 | 29.05 | 29.10 | 29.22 | 34.81 | 29.10 | 33.30 |
| 300 | 29.10 | 29.10 | 29.38 | 37.23 | 29.13 | 33.55 |
| 350 | 29.19 | 29.16 | 29.70 | 39.39 | 29.21 | 33.90 |

Table 1 shows that $c_p$ for air does not change significantly between $T_{air}$ and $T_{mix}$. Hence, one can safely assume:

$$c_{p_{air}}(T_{mix}) = c_{p_{air}}(T_{air}) \tag{7}$$

Specific heat for EGR can be easily analyzed assuming that EGR results from the complete combustion of pure methane. This assumption means that the only allowed products are $CO_2$, $H_2O$ and $N_2$, with $O_2$ also present when excess air is supplied. Armed with this assumption, the respective amounts of the products can be determined by applying the conservation of mass principle to the chemical equation. Mole fractions of the gaseous products of combustion vary as excess air ratio changes. Table 3 below tabulates the mole fractions of gaseous products of complete combustion of methane under these circumstances.

TABLE 3

Variation of mole fractions of gaseous products of complete combustion of methane with lambda

| Lambda | $H_2O$ | $N_2$ | $O_2$ | $CO_2$ |
|---|---|---|---|---|
| 1.0 | 0.190 | 0.715 | 0 | 0.095 |
| 1.5 | 0.131 | 0.738 | 0.065 | 0.065 |
| 1.8 | 0.110 | 0.746 | 0.088 | 0.055 |
| 2.0 | 0.100 | 0.750 | 0.100 | 0.050 |
| 3.0 | 0.068 | 0.763 | 0.135 | 0.034 |

The mixture specific heat $c_p$ in molar basis is the mole-fraction average of the respective component specific heats. The $c_p$ for EGR gas at various temperatures can therefore be calculated using the mole fraction data in Table 3.

Table 4 tabulates the variation of specific heats for EGR with temperature and lambda.

TABLE 4

Variation of $c_p$ of EGR with temperature and lambda (kJ/kg-K)

| Temp. K | 1 | 1.5 | 1.8 | 2 | 3 |
|---|---|---|---|---|---|
| 250 | 1.103 | 1.073 | 1.063 | 1.057 | 1.042 |
| 300 | 1.118 | 1.083 | 1.071 | 1.065 | 1.047 |
| 350 | 1.133 | 1.094 | 1.081 | 1.075 | 1.055 |

Considering Eq. (7), Eq. (6) can therefore be simplified as $$m_{egr} = m_{air} \cdot \frac{c_{p_{air}}(T_{mix}) \cdot [T_{mix} - T_{air}]}{c_{p_{egr}}(T_{mix}) \cdot [T_{egr} - T_{mix}]} \tag{8}$$

The ratio of specific heat $c_p$ (mass basis) of air to that of EGR used in Eq. (8) varies with variations in temperature, as is tabulated in Table 5.

TABLE 5

Ratio of $c_{p\text{-}air}$ to $c_{p\text{-}egr}$ (mass basis)

| Temp. K | 1 | 1.5 | 1.8 | 2 | 3 |
|---|---|---|---|---|---|
| 250 | 0.909 | 0.935 | 0.944 | 0.949 | 0.963 |
| 300 | 0.899 | 0.928 | 0.938 | 0.943 | 0.960 |
| 350 | 0.890 | 0.921 | 0.932 | 0.938 | 0.955 |

Using the $c_{p\text{-}air}$ to $c_{p\text{-}egr}$ ratio of 0.935, Eq. (9) becomes $$m_{egr} = 0.935 \cdot m_{air} \cdot \frac{[T_{mix} - T_{air}]}{[T_{egr} - T_{mix}]} \tag{9}$$

and $$mf_{egr} = \frac{0.935(T_{mix} - T_{air})}{T_{egr} - 0.065 T_{mix} - 0.935 T_{air}} \tag{10}$$

The variation of specific heats between air and EGR gas at various temperatures is negligible. If that variation is disregarded, then:

$$c_{p_{air}}(T_{mix}) = c_{p_{air}}(T_{air}) = c_{p_{egr}}(T_{egr}) = c_{p_{egr}}(T_{mix}) \tag{11}$$

Eq. (6) can then be further reduced to $$m_{egr} = m_{air} \cdot \frac{T_{mix} - T_{air}}{T_{egr} - T_{mix}} \tag{12}$$

and ultimately $$mf_{egr} = \frac{T_{mix} - T_{air}}{T_{egr} - T_{air}} \tag{13}$$

Hence, if one makes a few assumptions as described above, $mf_{egr}$ can be determined based solely on temperature measurements, negating the need for relatively bulky, expensive, and inaccurate mass flow meters and/or sensors.

Figure 3:
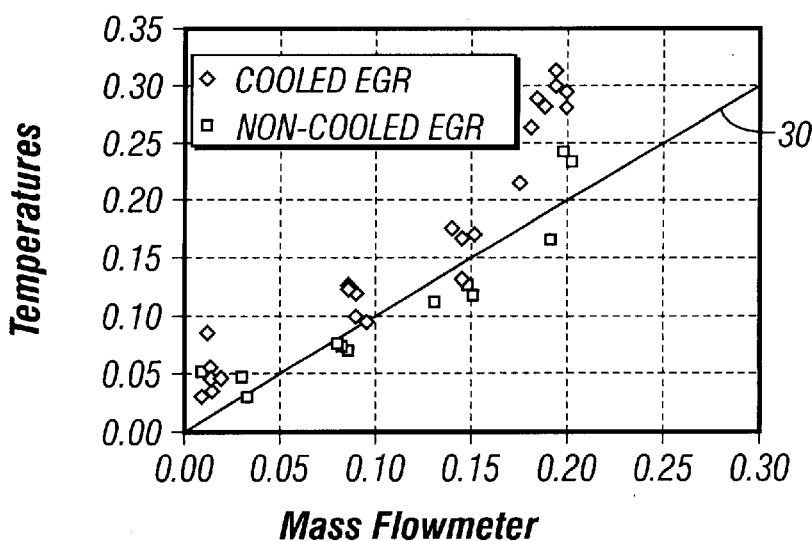
FIG. 3 is a graph illustrating the correlation between temperature-based calculations and direct mass flow measurements in the determination of EGR mass fraction.

These assumptions have proven sufficiently accurate to permit EGR control based solely on temperature measurement. Referring to FIG. 3, EGR mass fractions calculated from Eq. (13) using the appropriate $c_{p\text{-}air}$ to $c_{p\text{-}egr}$ ratios were compared with the corresponding mass fractions derived from direct mass flow measurements at various temperatures. Curve 30 demonstrates that the resulting correlation is sufficiently accurate to permit temperature based $mf_{egr}$ calculations to be used in place of direct mass flow measurement based $mf_{egr}$ calculations in the vast majority of applications.

3. Preferred EGR Systems

Figure 4:
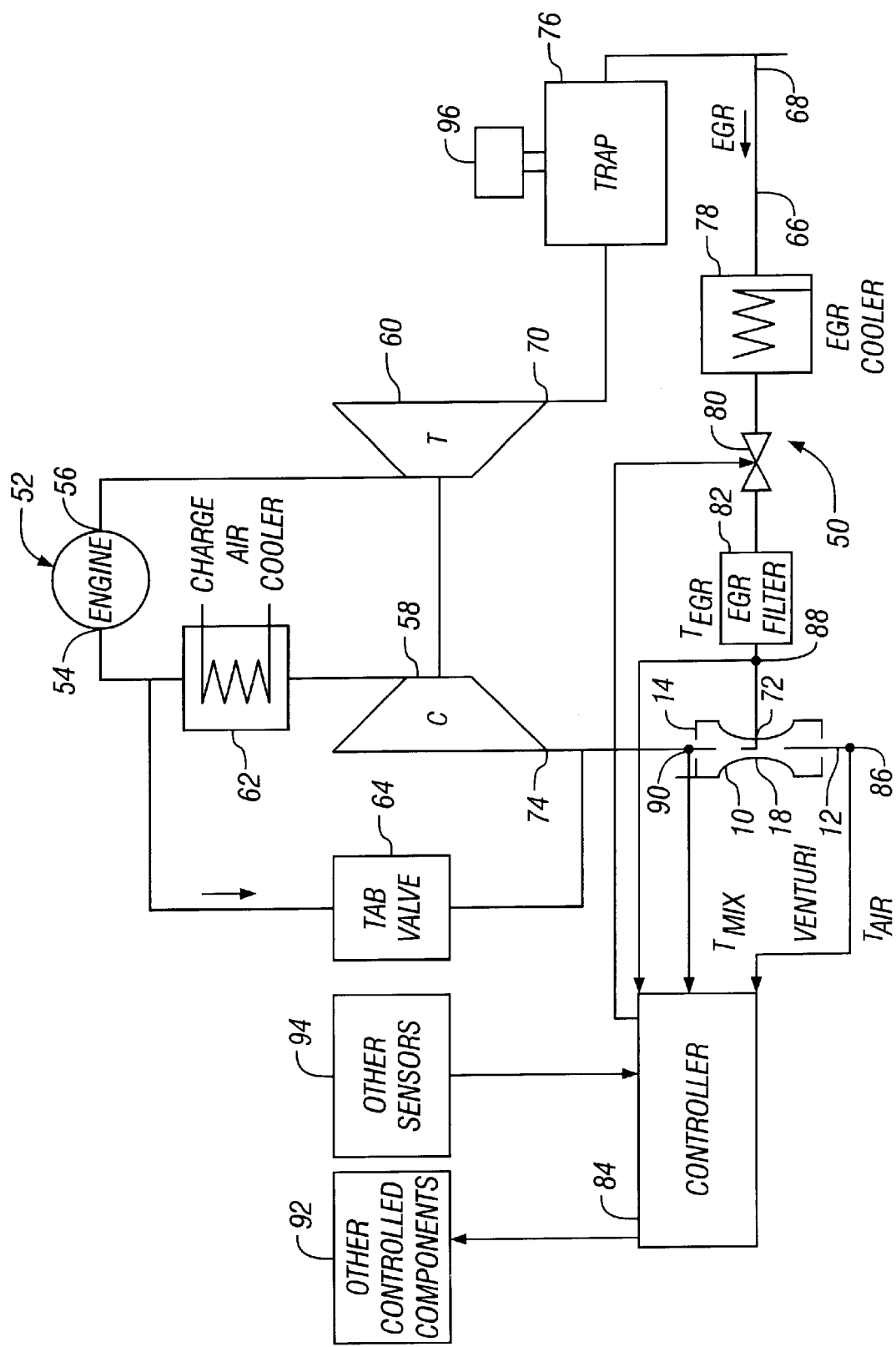
FIG. 4 schematically illustrates an engine incorporating an EGR system constructed in accordance with a preferred embodiment of the invention.

Referring now to FIG. 4, an EGR system well-suited to incorporate the above-described temperature-based EGR mass fraction calculations into its controls is illustrated at 50. The system is illustrated in conjunction with an internal combustion engine 52 that preferably comprises a compression ignition engine. It may be (1) a traditional diesel engine fueled exclusively with a liquid fuel, (2) a so-called "dual fuel" engine that can be fueled, depending on speed and load conditions, using either exclusively a liquid fuel or (3) a liquid pilot ignited gaseous fuel, or a so-called MicroPilot® engine fueled throughout its speed and load ranges by a liquid pilot ignited gaseous fuel. The engine 52 has an intake (typically comprising an air intake manifold 54), an exhaust (typically comprising an exhaust manifold 56), and other components (not shown) commonly found on a compression ignition engine such as a fuel injection system, intake and exhaust valves, etc. The illustrated engine 52 is a turbocharged engine having a compressor 58 located in the air intake system upstream of the intake manifold 54 and a turbine 60 located in the exhaust system downstream of the exhaust manifold 56. A passive or controllable air charge cooler 62 and a passive or active turbo or bypass (TAB) valve 64 are also provided for further treating and/or controlling compressed air flow to the air intake manifold 54. All of these components are conventional and, accordingly, will not be described in detail.

In accordance with a preferred embodiment of the invention, the EGR system 50 is configured to provide a variable, preferably controlled flow of EGR via an EGR line 66 having an inlet 68 in fluid communication with an outlet 70 of the turbine 60 and an outlet 72 in fluid communication with an inlet 74 of the compressor 58. The EGR system 50 includes, from upstream to downstream ends, a particulate trap 76 located upstream of the EGR line inlet 68, and an EGR cooler 78, an EGR valve 80, and an EGR filter 82, all located in the EGR line 66. The outlet of the EGR line 84 discharges into the EGR inlet 18 of the venturi 10 conceptually described in Section 2 above and structurally described in more detail below. A controller 84 is also provided to control operation of the EGR valve 80 under the input of a system of temperature sensors 86, 88, and 90. The controller 84 also typically will control operation of TAB valve 64 and other components of the engine such as the fuel injectors, etc. (collectively denoted 92) under controls of other sensors (collectively denoted 94) and/or one or more of the temperature sensors. Each of the major components of the EGR system 50 will now be described in turn.

The particulate trap 76 acts as a primary or first stage filter. It is configured to remove soot and other hot particulates from the exhaust stream. It preferably comprises a continuously regenerating particulate trap having an integral oxidation catalyst. The catalyst facilitates spontaneous oxidation and removal of soot and other particulate matter, including both solid and liquid particulates. The trap self regenerates by oxidation of the catalyst during normal operation. During startup or other periods when the engine does not sustain sufficiently high exhaust gas temperatures for catalytic oxidation, the trap 76 can be actively regenerated by the injection of a limited quantity of fuel from an injector 96. This active regeneration prevents excess back pressure across the trap 76 from clogging the trap. The EGR valve 80 may be closed during active regeneration to maximize the oxidation rate in the trap by maximizing the oxidation concentration in it. Even more preferably, active regeneration is triggered automatically when particulate concentrations in the trap 76 reach a designated level. For example, the controller 84 can be configured to inject fuel into the trap 76 from the injector 96 (either in conjuction with shutting off the EGR valve 80 or with leaving the EGR valve setting unchanged) when a pressure differential across the trap 76 exceeds a designated threshold. The pressure differential may be detected directly by a differential pressure sensor or indirectly by multiple pressure sensors or other techniques. If desired, a pressure limiter may be provided in a bypass line (not shown) passing around the trap 76 to permit limited EGR flow around the trap so as to avoid excessive pressure drop in the trap's catalytic converter.

Figure 5:
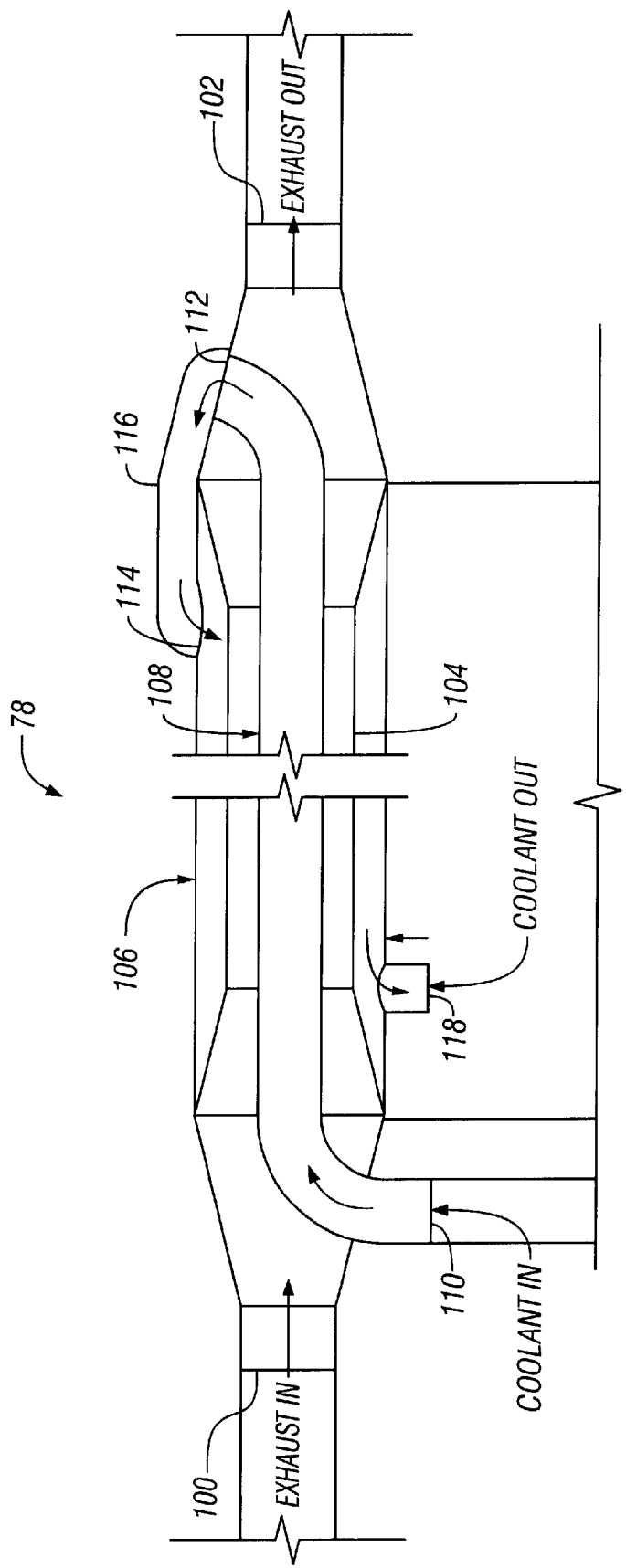
FIG. 5 somewhat schematically illustrates an EGR cooler usable in either the system of FIG. 4 or the modified system of FIG. 4A.

The purpose of the EGR cooler 78 is to reduce the temperature of the recirculated exhaust gases to a level at or below of which they could adversely affect the temperature of the mixture being inducted into the compressor 58. The EGR cooler 78 is configured to cool EGR, typically entering the cooler at a temperature of 275 to 400° C. to a temperature on the order of 50 to 100° C. A variety of commercially available coolers are suitable for this purpose. A preferred configuration of the cooler, illustrated in FIG. 5, is configured to cool the EGR by indirect heat transfer with liquid coolant diverted from the engine's existing coolant system (not shown). The EGR cooler 78 includes a generally tubular housing having a hot EGR inlet 100 and a cooled EGR outlet 102 at opposite ends thereof so as to form a EGR cooling chamber 104 therebetween. The cooling chamber 104 is annular in cross-section, being surrounded by a coolant jacket 106 and surrounding a coolant pipe 108. The coolant pipe 108 has an inlet 110 that is located near the EGR inlet 100, and an outlet 112 that is located near the EGR outlet 102 and that communicates with an inlet 114 of the coolant jacket 106 via an external coolant path 116. The coolant jacket 106 also has an outlet 118 that is located upstream of the inlet 114 in the direction of exhaust flow and that is connected to an inlet of the engine's coolant system. Hence, diverted coolant flows from the engine's coolant system, through the coolant pipe 108 from its inlet 110, through the coolant path 116 and the coolant jacket 106, and out of the coolant jacket outlet 118 to the engine's coolant system. Using this structure, only about 10% of the engine's coolant need be diverted to adequately cool the EGR flowing through the cooling chamber 104. In an alternative configuration (not shown), the ports 118 and 112 could be connected to the coolant system's outlet and inlet, respectively, thereby providing a counterflow system as opposed to the illustrated parallel flow system.

Referring again to FIG. 4, the EGR valve 80 may comprise any commercially available valve that can be selectively controlled to vary the EGR flow through the EGR line 66 at a given airflow rate through the venturi 10. An electronically controlled valve is especially preferred in order to permit active EGR control using the controller 84. A variety of commercially available EGR valves are suitable for this purpose.

The EGR filter 82 acts as a second stage or last ditch filter that removes any potentially harmful particulates that bypass or escape the particulate trap 76 before those particulates can be inducted into the engine's air intake system. A conventional air filter is acceptable for this purpose. Although the filter 82 is illustrated as being located downstream of the EGR valve 80, it could be located elsewhere in the EGR line 66, such as upstream of the EGR valve 80. However, it preferably is located downstream of the EGR cooler 78.

As should be clear from Section 2 above, the purpose of the venturi 10 is to create a pressure drop in air flowing through the engine's air intake system to draw EGR into the intake system. A variety of known fixed or variable venturi structures are acceptable for this purpose. The venturi 10 is preferably well insulated, e.g., by wrapping it with glass-fiber insulative blanket, to minimize heat transfer to or from the surroundings, thereby improving the accuracy of temperature measurements in the vicinity of the venturi 10.

In a particularly preferred embodiment, the venturi 10, comprises a fixed venturi capable of providing maximum EGR on the range of 20% of total gas flow when the EGR valve is in its fully open position at full load and higher amounts at part load. This effect can best be achieved by appropriately sizing the venturi. The design of the preferred venturi is based on a suction pressure of about 0.04 to 0.07, preferably 0.06 atmosphere and a Mach Number of about 0.2 to 0.5 and preferably about 0.3. At a suction pressure of 0.06 atmosphere and a Mach Number of 0.3, the relationship between preferred venturi dimensions in relation to air flow and EGR flow are as follows:

$$TFA_{AIR}=FR_{AIR}/(20\ in^2/(lb/min)) \quad (14)$$

where:

$TFA_{AIR}$=Air Total Flow Area, in², and
 $FR_{AIR}$=Air Flow Rate, lb/min;

$$TFA_{EGR}=FR_{EGR}/(100\ in^2/(lb/min)) \quad (15)$$

where:

TFA=EGR Total Flow Area, in², and
 $FR_{EGR}$=EGR Flow Rate, lb/min; and $$TFA_{MIX}=FR_{MIX}/(16.7\ in^2/(lb/min)), \quad (16)$$

where:

$TFA_{MIX}$=Mixture Total Flow Area, in²,
 $FR_{MIX}$=Mixture Flow Rate, lb/min.

At an air flow of 60 lb/min, which is typical of a 400 horsepower engine, the preferred throat area and corresponding throat diameter for a circular venturi are summarized in Table 6.

TABLE 6

| Flow Rate (lb/minute) | Venturi Throat Dimensions | |
|---|---|---|
| | Throat Area (in²) | Throat Diameter |
| AIR, 60 | 3.0 | 1.95 |
| EGR, 15 | 0.6 | 0.87 |
| Mixture, 75 | 3.6 | 2.14 |

Hence, the preferred venturi has a throat cross sectional area of 3.6/60 or 0.06 in² per lb/min rated airflow. Throat areas of between 0.056 and 0.063 in² per lb/min rated airflow are also acceptable in the preferred embodiment.

Still referring to FIG. 4, the controller 84 may comprise any conventional device or devices capable of receiving signals from the temperature sensors 86, 88, and 90 and other sensors 92 and of generating output signals for controlling the EGR valve 80 and the other controlled engine components to optimize one or more engine operating parameters such as lambda, NOx emissions, HC emissions, particulate concentration, etc. A programmable electronic control unit (ECU) is suitable for these purposes. At a minimum, the controller 84 should receive signals from the three temperature sensors 86, 88, and 90 measuring $T_{air}$, $T_{egr}$, and $T_{mix}$, respectively. The $T_{air}$ sensor 86 could be located between the air filter and the air inlet 12 of the venturi 10 or at any other location on the engine in which the sensor is capable of sensing air at a temperature at least approximately the same temperature as that being inducted into the venturi 10. The $T_{egr}$ sensor 88 should be located downstream of the EGR cooler 78 and preferably just upstream of the EGR inlet 18 of the venturi 10. The $T_{mix}$ sensor 90 should be located between the mixed gas outlet 14 of the venturi 10 and the compressor inlet 74, preferably within 4 inches from the insulated venturi. The controller 84 is operable, upon receiving signals from the sensors 86, 88, and 90, to calculate EGR mass fraction using the technique described in Section 2 above. If desired, the controller 84 could also calculate volumetric or mole fraction of EGR from the mass fraction using the derived molecular mass of the EGR gas, permitting EGR valve adjustment and other controls to be performed on a volumetric fraction or mole fraction basis as opposed to a mass fraction basis. These parameters would still be at least indirectly indicative of an EGR mass fraction.

In operation, exhaust gases exhausted from the exhaust manifold 56 of the engine 52 pass through the turbine 60 and then through the particulate trap 76, where at least a majority of soot and other particulates are removed. A percentage of those exhaust gases, determined by the setting of the EGR valve 80, is diverted from the main exhaust gas stream and into the EGR line 66. EGR flowing through the EGR line 66 is cooled in the EGR cooler 78 from a temperature of about 275–400° C. to a temperature of about 50–100° C. It then passes through the EGR valve 80, is further filtered in the EGR filter 82, and directed towards the EGR inlet 18 of the venturi 10. Simultaneously, ambient air flowing through the venturi 10 from the air inlet 12 to the mixture outlet 14 draws EGR into the throat 16 of the venturi 10, where the EGR mixes with the air before the resultant mixture is directed into the downstream portions of the engine's air intake system and into the compressor inlet 74. The mixture is then compressed, cooled in the air cooler 62, and inducted into the engine's intake manifold 54. Manifold absolute pressure (MAP) can be controlled during this process by suitable control of the TAB valve 64, a waste gate (not shown), and/or other device(s) under operation of the controller.

During this time, the controller 64 receives signals from the ambient air sensor 86, the EGR temperature sensor 88, and the mixture temperature sensor 90, calculates EGR mass fraction or another value indicative thereof, and adjusts the setting of the EGR valve 80 on a closed loop basis to obtain an EGR percentage on the basis of total gas flow to optimize a desired parameter(s) of engine operation for prevailing engine load or other operating conditions. This control is preferably performed on a closed loop basis, using the calculation $mf_{egr}$ or a value indicative thereof as a feedback parameter. For instance, an EGR valve setting could be adjusted on a closed loop basis to cause the calculated $mf_{egr}$ to at least approach a desired $mf_{egr}$. The control could also be performed on an open-loop basis. Either way, the controller 84 preferably will adjust the setting of the EGR valve 80 to obtain a range of from 0 to 50% of EGR mass fraction of the total gas flow, depending on speed and load conditions and on the interplay between EGR and other controls, such as HC reduction. This range will typically be from 5 to 20% at full load and 0 to 50% at part load. The engine operating parameter that is optimized by this adjustment typically will include at least NOx reduction. Other engine operating parameters, such as lambda, MAP, HC, and particulate concentration, can also be taken into account and controlled at least in part by adjusting the setting on the EGR valve 80. In addition, the EGR valve 80 should be turned off when the EGR temperature drops below about 150° F. to prevent condensation in the engine's air intake system. In a more sophisticated alternative embodiment, ambient relative and absolute humidity could be continuously monitored and used to determine and set a condensation limit for EGR flow. This limit could then be used to close the EGR valve 80 and/or take other measures to prevent condensation.

The controller 84 is also operable during this process to periodically actively regenerate the particulate trap 76 by injecting a limited supply of fuel into the trap 76 from the injector 96. As discussed above, fuel can be injected into the trap 76 to initiate active regeneration when a pressure differential across the trap 76 exceeds a designated value of, e.g., 20 inches of water.

If desired, additional exhaust emission reductions can be obtained through other open or closed loop controls of pretreatment or after treatment techniques such as water injection, air charge temperature reduction, etc. Since each of these emission reduction approaches can independently reduce emissions by 40 to 50%, the total reduction of the base EGR system 50 plus these enhancements can obtain up to 95% emissions, including NOx, CO, HC, and PM. Even without these enhancements, the base NOx system 50, when used in conjunction with a full sized particulate trap 76, can reduce NOx emissions on the order of 50%, and CO, HC, and PM on the order of 90%.

Figure 4A:
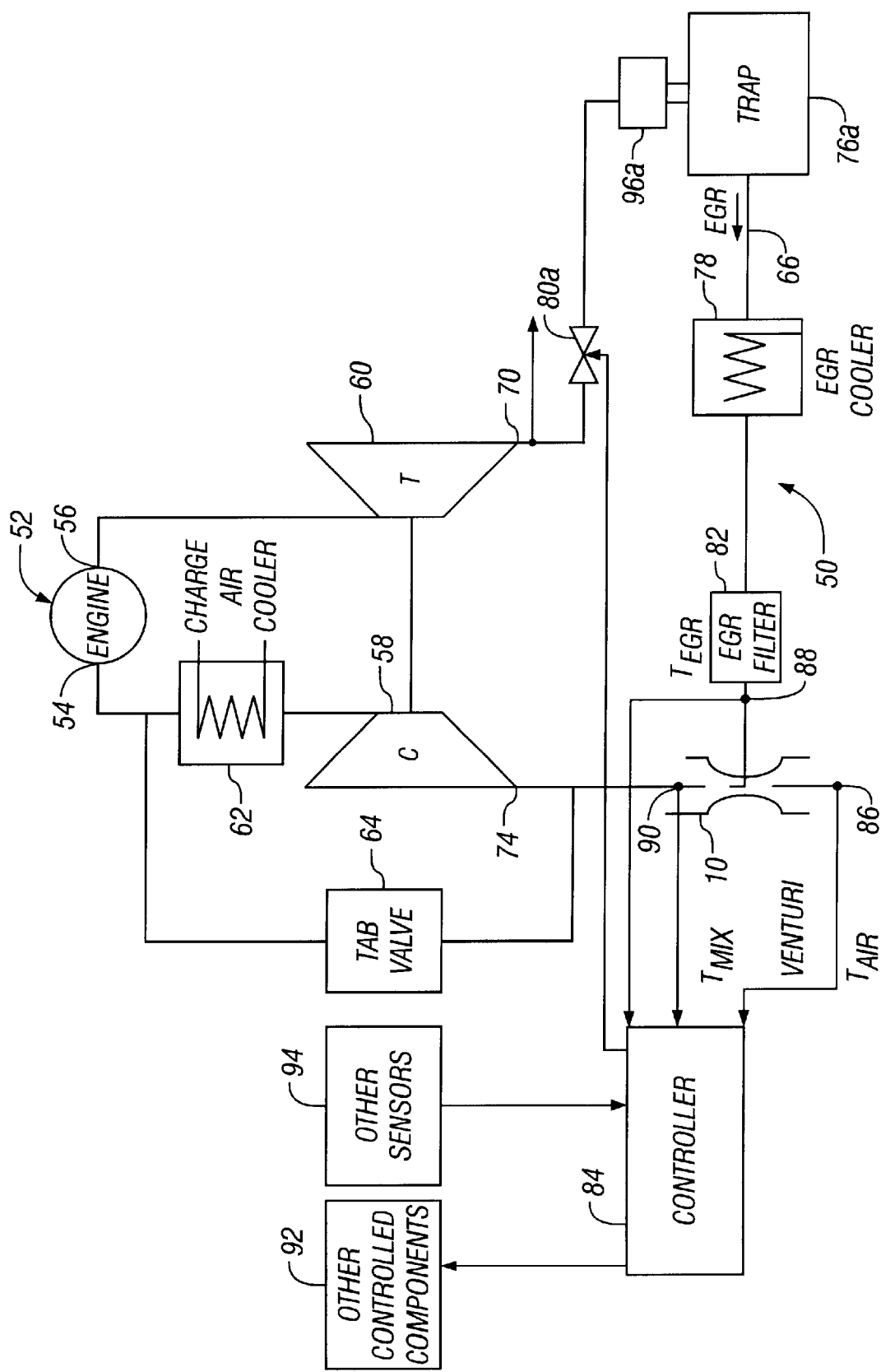
FIG. 4A schematically illustrates a modified form of the EGR system of the engine of FIG. 4.

Many changes and modifications could be made to the invention as described herein without departing from the spirit thereof. For instance, the EGR system could be reconfigured so that only the EGR gases pass through the particulate trap, thereby reducing the frequency at which the trap must be actively regenerated under low temperature conditions. This alternative form of the preferred embodiment is illustrated in FIG. 4a, in which the particulate trap 76a is located in the EGR line 66a downstream the EGR valve 80a and upstream of the EGR cooler 78. The engine 52 is otherwise unmodified with respect to the configuration of FIG. 4 and operates in the same manner using the same components 10, 58, 60, 78, 82, etc.

In addition, at least some of the aspects of the EGR system as described herein are usable in engines other than compression ignition engines and in engines in which the EGR system is passive rather than active. For instance, a combination of a particulate trap, EGR cooler, last ditch filter, and venturi as generally described above, and some of those components such as the venturi and/or the particulate trap, can be used in a system in which the EGR valve is omitted and the EGR flow rate instead is determined strictly by the air flow rate through the venturi. Active control of the EGR flow, if desired, could be obtained using devices other than a conventional EGR valve. One such device is described in the Gorel patent discussed above, and adjusts EGR flow by adjusting the setting of a variable throttle forming part of an EGR intake or other gas induction device replacing the venturi.

Still other changes and modifications that could be made to the invention without departing from the spirit thereof will become apparent from the appended claims:

We claim:

1. A method comprising:
(A) exhausting gases from an exhaust manifold of a compression ignition engine;
(B) separating a portion of said exhaust gases from the remainder of said exhaust gases under the control of an EGR valve;
(C) removing particulates from at least said portion of said exhaust gases using an actively regenerated catalytic particulate trap;
(D) cooling said portion of said exhaust gases; then
(E) filtering said portion of said exhaust gases; then
(F) mixing said portion of said exhaust gases with air in a venturi of an air induction system to form a mixture, said venturi generating a suction pressure of about 0.06 atmospheres and having a throat Mach Number of about 0.3 at an airflow rate through the venturi of about 60 lb/min.; and
(G) directing said mixture into an intake manifold of said engine;
(H) measuring
(1) a temperature of said portion of said exhaust gases after said portion is cooled,
(2) a temperature of said air, and
(3) a temperature of said mixture;
(I) calculating, based solely on the measuring step, a parameter indicative of a mass fraction of exhaust gases ($mf_{egr}$) in said mixture; and
(J) based on the calculating step, adjusting an EGR valve setting so as to adjust $mf_{egr}$ to at least approach a desired $mf_{egr}$.

2. An engine comprising:
(A) an intake manifold;
(B) an exhaust manifold;
(C) an intake passage connected to said intake manifold;
(D) an exhaust passage connected to said exhaust manifold;
(E) an EGR line having an inlet connected to said exhaust passage and an outlet connected to said intake passage;
(F) a first temperature sensor that is configured to measure a temperature of exhaust gases in said EGR line;
(G) a second temperature sensor that is configured to measure air temperature;
(H) a third temperature sensor that is configured to measure a temperature of an air/gas mixture in a portion said intake passage downstream of said EGR line outlet;
(I) a controller that is connected to said first, second, and third temperature sensors and that is operable to,
(1) calculate, based on signals received from said first, second, and third temperature sensors, a parameter indicative of a mass fraction of exhaust gases ($mf_{egr}$) in said mixture; and
(2) adjust an engine operating parameter based on the calculation; and
(J) an exhaust gas cooler located in said EGR line, wherein said exhaust cooler comprises an exhaust gas passage having an inlet and an outlet, a coolant tube extending though said exhaust gas passage and having a first port connected to a source of liquid coolant and having a second port, and an annular coolant jacket having a first port connected to said second port of said coolant tube and having a second port connected to said source of liquid coolant.

* * * * *